US008018846B2

(12) United States Patent
Hyon et al.

(10) Patent No.: US 8,018,846 B2
(45) Date of Patent: Sep. 13, 2011

(54) TRANSPORT CONTROL METHOD IN WIRELESS COMMUNICATION SYSTEM

(75) Inventors: Tae-In Hyon, Hwaseong-si (KR); Sang-Boh Yun, Seongnam-si (KR); Hoon Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1220 days.

(21) Appl. No.: 11/638,783

(22) Filed: Dec. 14, 2006

(65) Prior Publication Data

US 2007/0133416 A1 Jun. 14, 2007

(30) Foreign Application Priority Data

Dec. 14, 2005 (KR) ........................ 10-2005-0123484

(51) Int. Cl.
*H04L 12/26* (2006.01)
*H04J 3/16* (2006.01)
*H04B 7/00* (2006.01)

(52) U.S. Cl. ......................... 370/229; 370/469; 370/310

(58) Field of Classification Search .................. 370/310, 370/229, 469
See application file for complete search history.

(56) References Cited

U.S. PATENT DOCUMENTS

2001/0055312 A1* 12/2001 Negus ........................... 370/445
2002/0031088 A1 3/2002 Packer
2002/0156910 A1* 10/2002 Senda ........................... 709/232
2003/0212816 A1* 11/2003 Bender et al. ................. 709/237
2005/0169305 A1* 8/2005 Mori ............................. 370/466

FOREIGN PATENT DOCUMENTS

KR 1020020093543 12/2002
KR 1020050013777 2/2005

OTHER PUBLICATIONS

New medium access control (MAC) Protocol Performance Analysis for a New Medium Access Control Protocol in Wireless LANs Wireless Networks 10, 519-529, 2004 2004 Kluwer Academic Publishers, Manufactured in The Netherlands. Younggoo Kwon & Yuguang Fang & Haniph Latchman.*

DCF MAC for TCP Enhancing 802.11 DCF MAC for TCP/IP Communication Yoshifumi Nishida Sony Computer Science Laboratories Inc. Copyright 2005.*

(Continued)

*Primary Examiner* — Dwayne Bost
*Assistant Examiner* — Michael Mapa
(74) *Attorney, Agent, or Firm* — The Farrell Law Firm, P.C.

(57) ABSTRACT

A transport control method in a transmitter of a wireless communication system, which includes a transport layer having a congestion control function of transmitting data in a segment basis and retransmitting a segment if an RTO timer expires before receipt of an ACK segment is received in response to transmission of the segment and a MAC layer for detecting receipt of an ACK segment through a wireless link and transporting the detected ACK segment to the transport layer, includes temporarily storing received ACK segments in the MAC layer; detecting an average transmission rate of data segments; and transporting the stored ACK segments to the transport layer at the average transmission rate. Accordingly, by controlling an upward transport rate of a received ACK message by referring to an RTO value of a TCP in a MAC layer, unnecessary retransmission can be prevented by a congestion control function.

9 Claims, 4 Drawing Sheets

START
INITIALIZE TCP_RTO ~201
SET MAC_RTO ~202
TRANSMIT NEW TCP SEGMENT ~203
204 TCP_RTO EXPIRED? — YES → RETRANSMIT TCP SEGMENT ~205
NO
206 ACK RECEIVED? — NO
YES
207 MAC_RTO EXPIRED? — NO → STORE ACK ~208
YES
TRANSPORT ACK TO TCP ~209
UPDATE TCP_RTO ~210

OTHER PUBLICATIONS

Lefevre et al.: "Understanding TCP's Behavior over Wireless Links", Symposium on Communications and Vehicular Technology, Jan. 1, 2000.

Balakrishnan et al.: "A Comparison of Mechanisms for Improving TCP Performance over Wireless Links", IEEE/ACM Transactions on Networking, vol. 5, No. 6, Dec. 1, 1997.

Boggia et al.: "A Cross-layer Approach to Enchance TCP Fairness in Wireless Ad-hoc Networks", International Symposium on Wireless Communication Systems, Sep. 5, 2005.

Koike: "Active TCP Control by a Network", vol. 3, Dec. 5, 1999.

* cited by examiner

TRANSPORT CONTROL METHOD IN WIRELESS COMMUNICATION SYSTEM

PRIORITY

This application claims priority under 35 U.S.C. §119 to an application filed in the Korean Intellectual Property Office on Dec. 14, 2005 and assigned Serial No. 2005-123484, the contents of which are incorporated herein by reference.

BACKGROUND OF THE INVENTION

1. Field of the Invention

The present invention relates generally to a wireless communication system, and in particular, to a transport control method for increasing throughput of a wireless communication system through an interoperation between a medium access control (MAC) layer and a transport layer.

2. Description of the Related Art

A transmission control protocol (TCP) is designed to guarantee reliable data transmission in a wired Internet network. However, when the TCP is applied to a wireless network, throughput as in the wired network cannot be expected due to a burst error characteristic of a wireless link.

Since this burst error characteristic is similarly applied to an acknowledgement (ACK) message transmitted by a receiver to a transmitter responsive to a received packet, when an upper layer application requiring the same reliability as that of a file transmission control protocol (FTP) is served, a congestion control mechanism based on retransmission according to an ACK delay is frequently operated in the TCP. The frequent operation of the congestion control mechanism causes an increase in the number of packet retransmissions, thereby degrading system throughput.

An indirect TCP mechanism has been suggested to solve this problem. In the indirect TCP mechanism, flow and congestion control functions in a wireless link and a wired link can be separated by discriminating wireless TCP connection from wired TCP connection. However, the principal purpose of the TCP, i.e., the guarantee of end-to-end connection, disappears.

A snooping agent TCP mechanism has been suggested as an alternative for realizing the TCP in a wireless link. In the snooping agent TCP mechanism, a snooping agent is installed in a remote node and buffers a segment transmitted to a wireless terminal through a downstream link. If an ACK is not received, the snooping agent retransmits the segment to the wireless terminal. In the case of an upstream link, the snooping agent examines a sequence number of a segment received from the wireless terminal and requests the wireless terminal for retransmission of a segment of which transmission has failed using a selective repeat request algorithm. However, in the snooping agent TCP mechanism, since the snooping agent must have TCP stacks for every terminal and a memory for storing segments, it is very complicated and there are many overheads to implement the snooping agent TCP mechanism.

SUMMARY OF THE INVENTION

An object of the present invention is to substantially solve at least the above problems and/or disadvantages as well as to provide at least the set forth below advantages below. Accordingly, an object of the present invention is to provide a transport control method for minimizing the degradation of transmission throughput according to the characteristics of a wireless link in a wireless communication system using a transport layer protocol having a congestion control function.

Still another object of the present invention is to provide a transport control method for improving TCP throughput by reducing the number of retransmission timeout (RTO) reestablishments by means of a MAC layer controlling ACK transport in response to a TCP segment considering a TCP RTO timer in a wireless communication system using a TCP as a transport layer protocol.

According to an aspect of the present invention, there is provided a transport control method in a transmitter of a wireless communication system, which has a transport layer having a congestion control function for transmitting data in a segment basis and retransmitting a segment if an RTO timer expires before an ACK segment is received in response to transmission of the segment and a MAC layer for detecting an ACK segment received through a wireless link and then transporting the detected ACK segment to the transport layer. The transport control method including temporarily storing received ACK segments in the MAC layer; detecting an average transmission rate of data segments; and transporting the stored ACK segments to the transport layer at the average transmission rate.

According to still another aspect of the present invention, there is provided a transport control method including the steps of performing a flow control of received ACK segments in a MAC layer; transporting at least one of the flow-controlled ACK segments to a transport layer; and resetting an RTO timer according to the ACK segment received from the MAC layer in the transport layer.

According to yet still another aspect of the present invention, there is provided a transport control method in a transmitter of a wireless communication system, which has a TCP layer for performing a congestion control using an RTO timer and a MAC layer for detecting an ACK segment received in response to a data segment transmitted by the TCP layer and transporting the detected ACK segment to the transport layer, the transport control method including of performing a flow control of the received ACK segment in a MAC layer; and resetting the RTO timer according to the ACK segment received from the MAC layer in the TCP layer.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described herein below with reference to the accompanying drawings.

Figure 1:
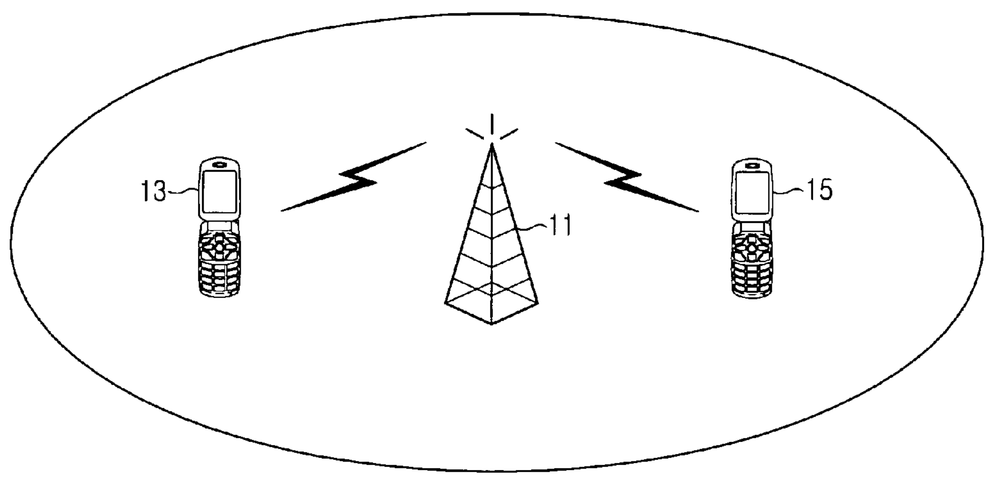
FIG. 1 is a schematic configuration illustrating a wireless communication system using a transport control method according to the present invention.

FIG. 1 is a schematic configuration illustrating a wireless communication system using a transport control method according to a preferred embodiment of the present invention.

FIG. 1 illustrates a communication environment supporting end-to-end communication between terminals through a remote node 11 forming a wireless link with each of two terminals 13 and 15 located in a coverage area thereof.

In the transport control method according to the present invention, a MAC layer of a transmission terminal appropriately maintains an RTO value, which is a parameter used for a congestion control mechanism of a TCP layer, by checking the RTO value and controlling transport of ACK messages received from a reception terminal to the TCP layer considering the RTO value. In other words, even if the transmission terminal burstily receives ACK messages in response to TCP segments, the transmission terminal can prevent a decrease of an entire transmission rate due to frequent RTO initialization by reducing the number of RTO expirations by controlling an ACK transport rate from the MAC layer to the TCP layer.

For simplicity of description, an RTO value of the TCP layer is called a TCP_RTO value, and a parameter value set based on the TCP_RTO value in the MAC layer is called a MAC_RTO value.

Figure 2:
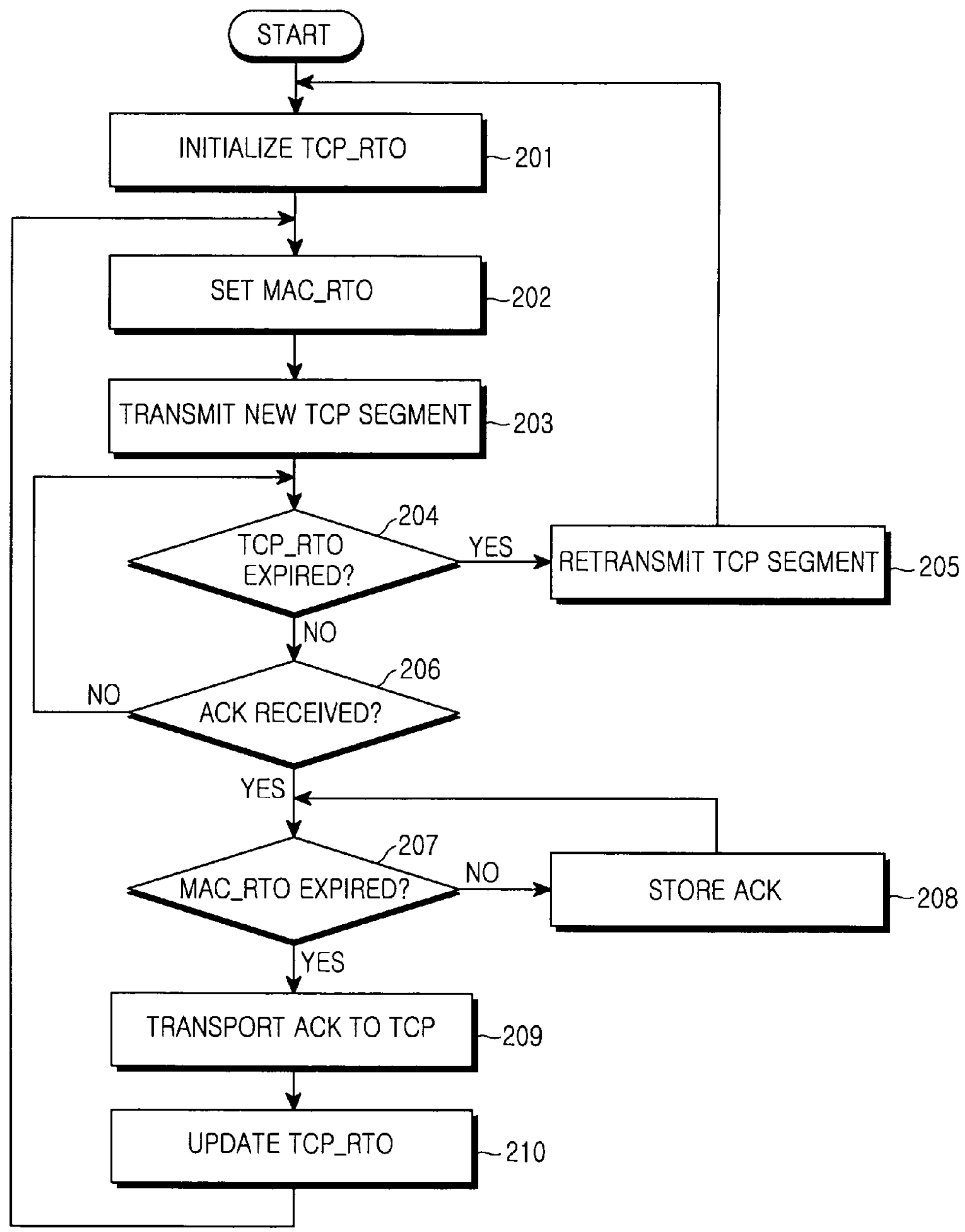
FIG. 2 is a flowchart illustrating a transport control method according to the present invention.

FIG. 2 is a flowchart illustrating a transport control method according to the present invention. Referring to FIG. 2, when a TCP_RTO value is initialized in a transmitter in step 201, the transmitter sets a MAC_RTO value according to the initial TCP_RTO value in step 202 and transmits a TCP segment in step 203. After transmitting the TCP segment, the transmitter determines in step 204 whether the TCP_RTO value has expired. In step 204, if the TCP_RTO value has expired before an ACK message in response to the TCP segment is received, the transmitter retransmits the TCP segment in step 205 and initializes the TCP_RTO value again.

If the TCP_RTO value has not expired, the transmitter determines in step 206 whether the ACK message in response to the TCP segment is received, and if the ACK message is received, the transmitter determines in step 207 whether the MAC_RTO value has expired. If the MAC_RTO value has not expired, the transmitter stores the ACK message in a buffer in step 208 and waits until the MAC_RTO value expires. If the MAC_RTO value has expired, the transmitter transports the stored ACK message to the TCP layer in step 209 and updates the TCP_RTO value in step 210. Then, the transmitter sets the MAC_RTO value according to the updated TCP_RTO value.

As is well known, since the TCP congestion control mechanism uses a slow start function in general, when the TCP_RTO value is initialized, data transmission begins again at the lowest transmission rate. Thus, if the TCP_RTO value is frequently initialized, system throughput decreases.

As in step 208, even if an ACK message is received in a burst by the receiver, since the MAC layer transports the ACK message to the TCP layer not immediately but at the MAC_RTO expiration time set to the time right before the TCP_RTO value expires, the TCP_RTO value can be prevented from expiring in an earlier time. By doing this, frequent transmission rate initialization due to the TCP_RTO expiration can be prevented, and a sufficient time can be granted to ACK messages to be received.

Figure 3:
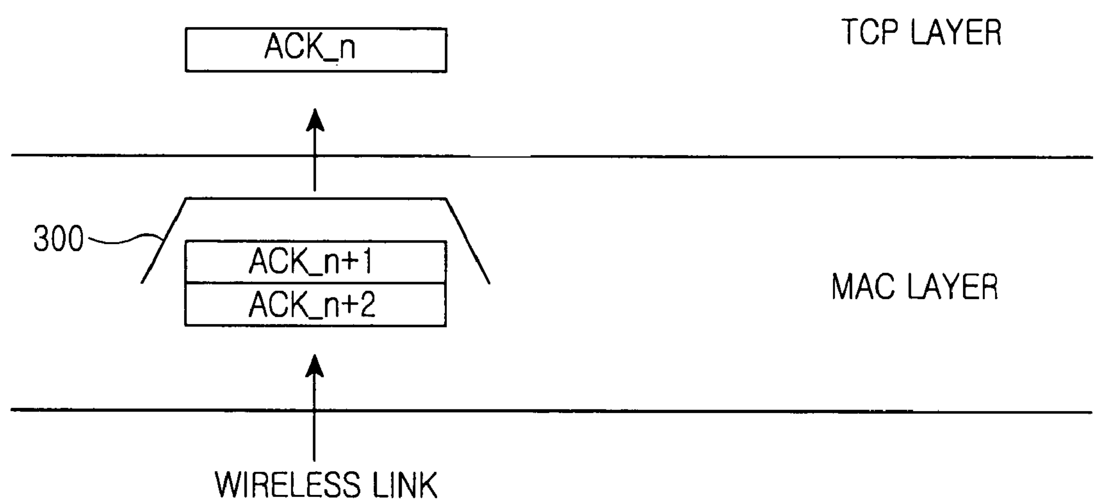
FIG. 3 is a conceptual diagram for explaining an ACK processing process of a MAC layer in a transport control method according to the present invention.

FIG. 3 is a conceptual diagram for explaining an ACK processing process of a MAC layer in a transport control method according to the present invention.

Referring to FIG. 3, when ACK_n, ACK_n+1, and ACK_n+2 messages are received in series, the MAC layer transports only the ACK_n message to a TCP layer at a MAC_RTO expiration time by referring to a MAC_RTO value for the ACK_n message and temporarily stores the ACK_n+1 and ACK_n+2 messages. The TCP layer, which has received the ACK_n message, resets a TCP_RTO value, and the MAC layer sets the MAC_RTO value to a value less than the reset TCP_RTO value and transports the ACK_n+1 message or the ACK_n+1 and ACK_n+2 messages to the TCP layer at the MAC_RTO expiration time. The number of ACK messages transported to the TCP layer is determined by temporal average throughput and long term nominal throughput.

Figure 4:
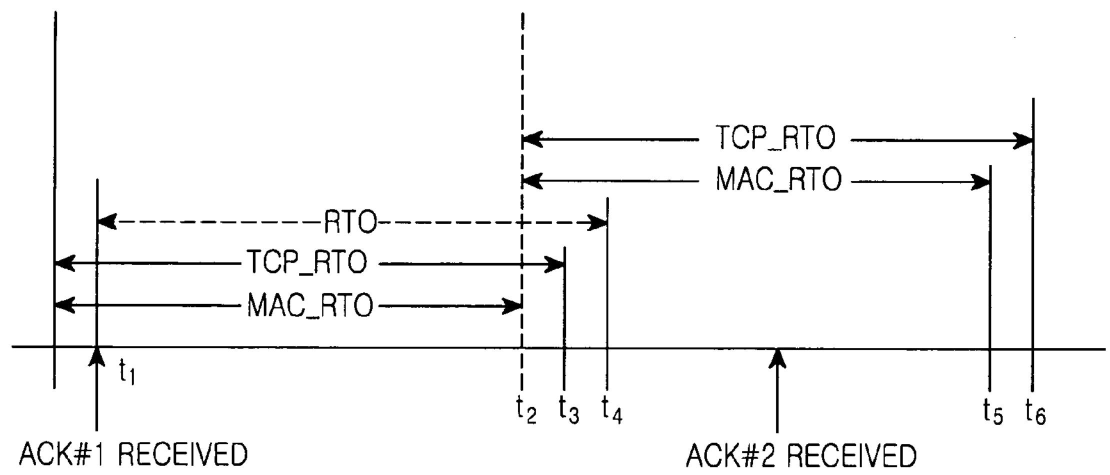
FIG. 4 is a conceptual diagram for explaining a process of setting TCP_RTO in a transport control method according to the present invention.

FIG. 4 is a conceptual diagram for explaining a process of resetting TCP_RTO in a transport control method according to the present invention. Referring to FIG. 4, if an expiration time of the TCP_RTO value is t3 and an ACK#1 message is received at t1, in the conventional TCP, a MAC layer transports the ACK#1 message to a TCP layer at t1. The TCP layer, which has received the ACK#1 message, resets the RTO value at t1, and an expiration time of the reset RTO value becomes t4.

However, in the transport control method, even if the ACK#1 message is received at t1, a MAC layer waits until t2, which is an expiration time of a MAC_TRO value set by referring to the TCP_RTO value and transports the ACK#1 message to a TCP layer at t2, without immediately transporting the ACK#1 message to the TCP layer. Thus, the TCP layer resets the TCP_RTO value to the MAC_TRO expiration time t2, which is the time when the ACK#1 message is transported, and thus, an expiration time of the reset TCP_RTO value becomes t6, and an expiration time of the MAC_TRO value becomes t5.

In the conventional TCP, since the RTO value expires at t4, if an ACK#2 message is received a certain time between t4 and t5, a relevant TCP segment is retransmitted, and a transmission rate is initialized. However, in the transport control method according to the present invention since the TCP_RTO value is expanded to t5, retransmission does not occur.

As described above, in a transport control method according to the present invention, by controlling an upward transport rate of a received ACK message by referring to an RTO value of a TCP in a MAC layer, unnecessary retransmission can be prevented by a congestion control function. In addition, by reducing the number of RTO expirations, frequent transmission rate initialization can be prevented, thereby improving system throughput.

Further, by expanding an RTO resetting time to a MAC_RTO expiration time rather then the time when an ACK message is received, an ACK loss due to a delay, which can be generated by a burst characteristic of a wireless link, can be prevented.

While the present invention has been shown and described with reference to a certain preferred embodiment thereof, it will be understood by those skilled in the art that various changes in form and details may be made therein without departing from the spirit and scope of the present invention as defined by the appended claims.

What is claimed is:

1. A transport control method in a transmission terminal of a wireless communication system having a transport layer having a congestion control function of transmitting data in a segment basis and retransmitting a segment if a retransmission timeout (RTO) timer expires before receipt of an acknowledgement (ACK) segment from a reception terminal of the wireless communication system in response to transmission of the segment, and a medium access control (MAC) layer for detecting receipt of an ACK segment through a wireless link and transporting the detected ACK segment to the transport layer, the transport control method comprising:

temporarily storing received ACK segments from the reception terminal in the MAC layer of the transmission terminal;

detecting an average transmission rate of data segments; and transporting the stored ACK segments from the MAC layer to the transport layer of the transmission terminal at the detected average transmission rate.

2. A transport control method in a transmission terminal of a wireless communication system having a transport layer having a congestion control function of transmitting data in a segment basis and retransmitting a segment if a retransmission timeout (RTO) timer expires before receipt of an acknowledgement (ACK) segment from a reception terminal of the wireless communication system in response to transmission of the segment, and a medium access control (MAC) layer for detecting receipt of an ACK segment received through a wireless link and transporting the detected ACK segment to the transport layer, the transport control method comprising: performing a flow control of received ACK segments from the reception terminal in the MAC layer of the transmission terminal; transporting at least one of the flow-controlled ACK segments from the MAC layer to the transport layer of the transmission terminal; and resetting an RTO timer according to the ACK segment received from the MAC layer in the transport layer, wherein performing the flow control comprises: detecting an average transmission rate of the TCP layer; and transporting the ACK segment to the TCP layer at the average transmission rate.

3. The transport control method of claim 2, wherein performing the flow control further comprises: setting a transport timer of the MAC layer based on the RTO timer; determining whether the transport timer has expired; and determining an expiration time of the transport timer as the time when the ACK segment is transported.

4. The transport control method of claim 3, wherein the expiration time of the transport timer is earlier than an expiration time of the RTO timer.

5. The transport control method of claim 4, wherein the RTO timer is reset at the time when the transport timer expires.

6. A transport control method in a transmission terminal of a wireless communication system having a transmission control protocol (TCP) layer for performing a congestion control using a retransmission timeout (RTO) timer, and a medium access control (MAC) layer for detecting receipt of an acknowledgement (ACK) segment from a reception terminal of the wireless communication system in response to a data segment transmitted by the TCP layer and transporting the detected ACK segment to the transport layer, the transport control method comprising: performing a flow control of the received ACK segment from the reception terminal in the MAC layer of the transmission terminal; and resetting a RTO timer according to the ACK segment received from the MAC layer in the TCP layer of the transmission terminal, wherein performing the flow control comprises: detecting an average transmission rate of the TCP layer; and transporting the ACK segment to the TCP layer at the average transmission rate.

7. The transport control method of claim 6, wherein transporting the ACK segment comprises: comparing a reception rate of the received ACK segment to the average transmission rate; if the reception rate is greater than the average transmission rate, transporting ACK segments corresponding to the average transmission rate to the TCP layer and storing the remaining ACK segments; and if the reception rate is less than the average transmission rate, transporting the stored ACK segments to the TCP layer.

8. The transport control method of claim 7, wherein transporting the stored ACK segments to the TCP layer comprises:

determining whether a pre-set transport timer has expired; and transporting at least one of the stored ACK segments to the TCP layer at the time when the transport timer expires.

9. The transport control method of claim 8, wherein the transport timer expires earlier than the RTO timer.

* * * * *